US012693577B2

(12) United States Patent
Luo et al.

(10) Patent No.: US 12,693,577 B2
(45) Date of Patent: Jul. 28, 2026

(54) LOCKING STRUCTURE FOR CAMERA MODULE AND CAMERA MODULE

(71) Applicant: GALAXYCORE SHANGHAI LIMITED CORPORATION, Shanghai (CN)

(72) Inventors: Jun Luo, Shanghai (CN); Yong Xu, Shanghai (CN)

(73) Assignee: GALAXYCORE SHANGHAI LIMITED CORPORATION, Shanghai (CN)

( * ) Notice: Subject to any disclaimer, the term of this patent is extended or adjusted under 35 U.S.C. 154(b) by 81 days.

(21) Appl. No.: 18/693,114

(22) PCT Filed: Sep. 14, 2022

(86) PCT No.: PCT/CN2022/118633
§ 371 (c)(1),
(2) Date: Mar. 18, 2024

(87) PCT Pub. No.: WO2023/040871
PCT Pub. Date: Mar. 23, 2023

(65) Prior Publication Data
US 2024/0385497 A1 Nov. 21, 2024

(30) Foreign Application Priority Data

Sep. 18, 2021 (CN) .......................... 202111103895.8

(51) Int. Cl.
*G03B 13/36* (2021.01)
*G02B 7/09* (2021.01)
*H04N 23/54* (2023.01)

(52) U.S. Cl.
CPC .............. *G03B 13/36* (2013.01); *G02B 7/09* (2013.01); *H04N 23/54* (2023.01)

(58) Field of Classification Search
CPC .......... G03B 13/36; G03B 30/00; G02B 7/09; H04N 23/54
See application file for complete search history.

(56) References Cited

U.S. PATENT DOCUMENTS

2008/0008463 A1* 1/2008 Otsuka ..................... G03B 5/02
396/55
2013/0286283 A1 10/2013 Zhou
(Continued)

FOREIGN PATENT DOCUMENTS

CN 209105233 U 7/2019
CN 110821300 A 2/2020
(Continued)

OTHER PUBLICATIONS

International Search Report issued for International Patent Application No. PCT/CN2022/118633 mailed Oct. 31, 2022 with English translation.
(Continued)

*Primary Examiner* — Gevell V Selby
(74) *Attorney, Agent, or Firm* — Merchant & Gould P.C.

(57) ABSTRACT

A locking structure for a camera module and a camera module. The locking structure comprises: a coil unit; and a magnetic unit, the magnetic unit being disposed opposite to the coil unit. When the coil unit is energized, the direction of the magnetic field generated by the coil unit interacts with the direction of the magnetic field of the magnetic unit so as to drive the relative movement of the coil unit and the magnetic unit. The locking structure having such a structure has a simple structure and is easy to assemble. Moreover, the performance of the locking structure can be independently tested and maintained, thereby ensuing that the locking structure has a high yield rate.

19 Claims, 3 Drawing Sheets

(56)          References Cited

U.S. PATENT DOCUMENTS

2018/0246296 A1* 8/2018 Sugawara ............. H04N 23/57
2018/0352133 A1* 12/2018 Yoneda ................. H04N 23/55
2024/0069299 A1* 2/2024 Hu ........................ G02B 7/023

FOREIGN PATENT DOCUMENTS

| CN | 112492126 A | 3/2021 |
| CN | 213693430 U | 7/2021 |
| CN | 113411484 A | 9/2021 |
| JP | 08179416 A | 7/1996 |

OTHER PUBLICATIONS

First Chinese Office Action issued Apr. 21, 2026.

* cited by examiner

LOCKING STRUCTURE FOR CAMERA MODULE AND CAMERA MODULE

CROSS-REFERENCE TO RELATED APPLICATIONS

This application is the National Phase of International Application No. PCT/CN2022/118633, filed on Sep. 14, 2022, which claims the priority to Chinese Patent Application No. 202111103985.8, filed on Sep. 18, 2021, with the China National Intellectual Property Administration, the entire contents of which are incorporated into this application by reference.

TECHNICAL FIELD

The present disclosure relates to the field of camera module, and in particular, to a locking structure for a camera module and a camera module.

BACKGROUND

At present, most mobile devices, such as mobile phones and tablet computers, are equipped with a camera module to realize conversion between an optical signal and an electrical signal and to record and save image information, to realize camera and photographic functions. Cell phone Camera Module (CCM) is widely used in various new generation portable camera equipment, due to its advantages of miniaturization, low power consumption, low cost, and high image quality, and the like, as compared with traditional camera systems. In terms of structure a camera module generally may include a lens unit, a Voice Coil Motor (VCM), an infrared cut-off filter, an image sensor, a Flexible Printed Circuit board (FPC) or a Printed Circuit Board (PCB), and a connector coupled with a mobile motherboard. The voice coil motor is used to realize an automatic focusing function of the lens unit, and typically includes a magnet, a coil and other structures. During operation of the camera module, the coil is first given a current to cut a magnetic inductance line in a magnetic field to generate an electromagnetic force. The coil or the magnet may move under the action of the electromagnetic force to drive the lens unit coupled with the voice coil motor to move, to adjust an image distance and an object distance of the camera module to present a clear image. In general, a Hall-effect Sensor may be further provided in the voice coil motor to measure a change in the magnetic field in the voice coil motor, to determine a position of the coil or the magnet according to the change, so that closed-loop control of the voice coil motor may be realized.

With rapid development of the smartphone industry, there is a gradually increasing requirement for mobile camera's functions of a smartphone. Travel of the voice coil motor constantly increases as focusing range constantly increases. However, restrained by a thickness of the mobile phone and a back cover with protective glass, travel of the motor could not increase limitlessly. Moreover, in order to achieve better image quality and provide customers with a better photo experience, a CMOS Image Sensor (CIS) with a larger optical size is often used in a terminal in the mobile phone industry. Nevertheless, a larger CIS requires a higher lens focal length and a higher lens length, which may lead to an increase in the thickness of the mobile phone. Due to a limitation of the thickness of the mobile phone, image quality of a camera does not increase in equal proportion with the increase of the optical size of CIS, and an effect in macro shooting of the camera is limited to a certain extent. In addition, a structure of upper and lower shrapnel may not be used in a motor with ultra-long travel, otherwise the travel will be limited, and a corresponding locking structure is required to fix a moving part to avoid the moving part going out due to inertia or an external force when the moving part is not working to protect the moving part.

At present, assembly of the locking structure is very difficult, and there is no locking structure that may robustly protect the camera module when the camera module is not working.

Therefore, there is a need for a locking structure that is easy to assemble and robustly protect the camera module when the camera module is not working.

SUMMARY

The present disclosure provides a locking structure for a camera module and a camera module, and the locking structure has simplified assembly and may robustly protect the camera module when the camera module is not working.

The present disclosure provides a locking structure for a camera module, which includes a coil unit; and a magnetic unit provided to be opposite to the coil unit, and when the coil unit is energized, the coil unit may generate a magnetic field with a direction interacting with a magnetic field direction of the magnetic unit, to drive a relative movement between the coil unit and the magnetic unit.

In some embodiments, the locking structure for a camera module further includes a fixing part including a fixing base and a sliding rail located on the fixing base, and the sliding rail extends along a direction parallel to a moving direction of the magnetic unit or the coil unit.

In some embodiments, the fixing base further has a coil winding column, and the sliding rail is arranged on two sides of the coil winding column, the coil unit is wound round the coil winding column.

In some embodiments, the fixing part has at least two sliding rails, and at least one of the sliding rails and the remaining sliding rail(s) are arranged on two sides of the coil winding column, respectively.

In some embodiments, the fixing base has one or more coil winding columns, and the number of the coil winding column corresponds to the number of the coil unit.

In some embodiments, when the number of the coil winding column is plural, the sliding rails are located on two sides of the coil winding columns, and the coil winding columns are arranged parallel to each other.

In some embodiments, the locking structure for a camera module includes one or more coil units, when the number of coil units is plural, the plurality of the coil units are arranged side by side, and when the coil units are energized, adjacent coil units generate magnetic fields with opposite directions.

In some embodiments, the locking structure for a camera module further includes an elastic part including one end fixedly connected to the magnetic unit.

In some embodiments, when the coil unit is energized, and when the relative movement occurs between the coil unit and the magnetic unit, the other end of the elastic part is pressed, and the elastic part is in a compressed state.

In some embodiments, when the coil unit is deenergized, the magnetic field thereof disappears, and the magnetic unit is driven by a resilience force of the elastic part to recover.

In some embodiments, the locking structure for a camera module further includes a locking slider, and a sliding piece is provided between the locking slider and the sliding rail.

In some embodiments, the locking slider has an accommodating cavity, and the magnetic unit is detachably fixed in the accommodating cavity.

In some embodiments, the locking slider has a locking tongue, and the locking tongue is located on an outer wall of the accommodating cavity.

In some embodiments, the locking slider has one or more locking tongues, and when the number of the locking tongue is plural, the locking tongues are evenly arranged in an elongated direction of the magnetic unit.

In some embodiments, the locking slider further has a connecting part, and the connecting part is located on a side wall of the accommodating cavity, and one end of the elastic part is detachably connected to the connecting part.

In some embodiments, the locking structure for a camera module further includes a casing, and one side of the casing is provided with a mounting groove, the locking slider is installed in the mounting groove, and when the magnetic unit and the coil unit move relative to each other, the other end of the elastic part is against and pressed by a side wall of the mounting groove.

In some embodiments, the mounting groove is provided with a through hole, and the locking tongue passes through the through hole.

In some embodiments, the locking structure for a camera module further includes an enhance magnetic board adsorbed on a surface of the magnetic unit, and the enhance magnetic board is located between the magnetic unit and the accommodating cavity.

In some embodiments, the fixing part further includes an adsorbing magnetic board, and the adsorbing magnetic board is located on the fixing base, arranged on two opposite sides of the fixing base with the sliding rail, and used for adsorbing the magnetic unit on the fixing base.

In some embodiments, the locking structure for a camera module includes one or more magnetic units, and when the number of magnetic unit is plural, two adjacent magnetic units are provided to have opposite magnetic poles.

In some embodiments, the elastic part is a spring or is an elastic component including a spring.

In some embodiments, the sliding piece is a metallic ball or a ceramic ball.

Correspondingly, the present disclosure further provides a camera module, which includes a base; a movable unit for driving a camera to move along a direction of an optical axis thereof; and at least one locking structure as described above, and the relative movement between the coil unit and the magnetic unit is used for locking or unlocking the movable unit.

In some embodiments, the camera module includes one or more locking structures, and when the number of the locking structure is plural, the locking structures are evenly arranged in the periphery of the movable unit.

In some embodiments, the relative movement between the coil unit and the magnetic unit is in a direction perpendicular to the direction of the optical axis of the camera.

Embodiments of the present disclosure have the following advantages.

The locking structure in the present disclosure includes the coil unit and the magnetic unit. The magnetic unit is provided toward the coil unit. Additionally, when the coil unit is energized, the direction of the magnetic field generated by the coil unit is opposite to the magnetic field direction of the magnetic unit, for driving the relative movement between the coil unit and the magnetic unit. The locking structure is simple in structure, easy to assemble, and may be tested and repaired separately, so that it is ensured that the locking structure has a relatively high yield.

The camera module in the present disclosure includes the locking structure as described above, so that even when the camera module is not working, the locking structure is still able to play a protective role to the camera module.

DETAILED DESCRIPTION

As mentioned in the BACKGROUND, there is a need to provide a locking structure that is easy to assemble and able to robustly protect the camera module when the camera module is not working.

The embodiments of the present disclosure provide a locking structure for a camera module and a camera module. And, when the coil unit is energized, the direction of the magnetic field generated by the coil unit is opposite to the magnetic field direction of the magnetic unit, for driving the relative movement between the coil unit and the magnetic unit. The locking structure is simple in structure, easy to assemble, and may be tested and repaired separately, so that it is ensured that the locking structure has a relatively high yield.

In order to make the above-mentioned purposes, features and advantages of the present disclosure clearer and more understandable, specific embodiments of the present disclosure will be described in detail below in conjunction with the accompanying drawings.

Figure 1:
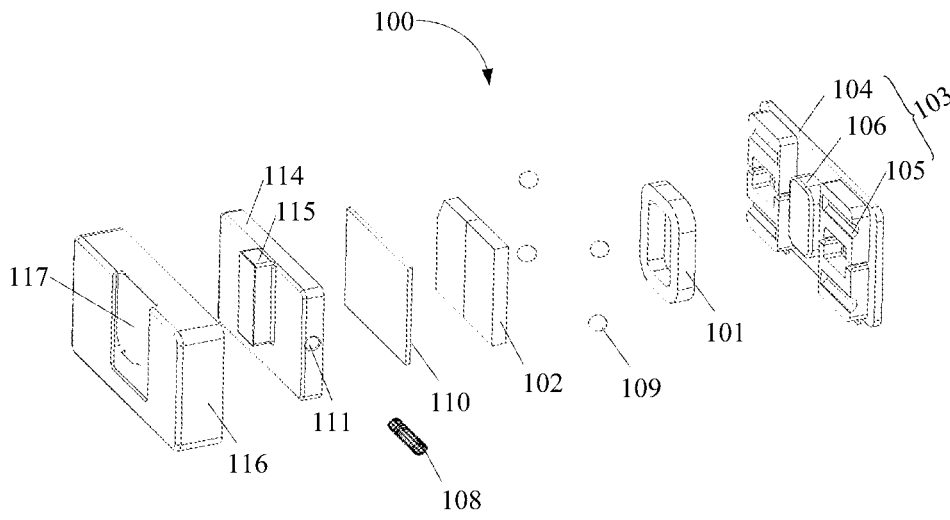
FIG. 1 is a schematic structural exploded view of a locking structure according to an embodiment of the present disclosure.
Figure 2:
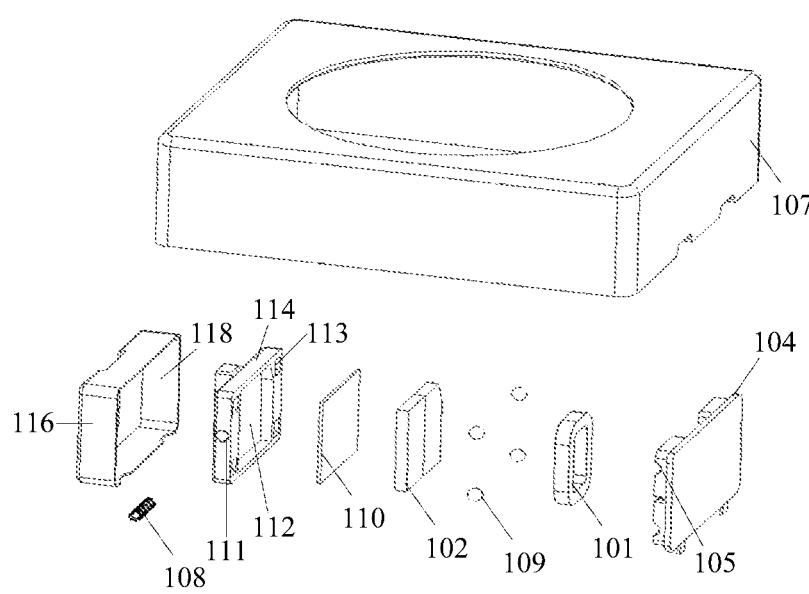
FIG. 2 is a schematic structural exploded view of the locking structure in FIG. 1 containing an adsorbing magnetic board.
Figure 3:
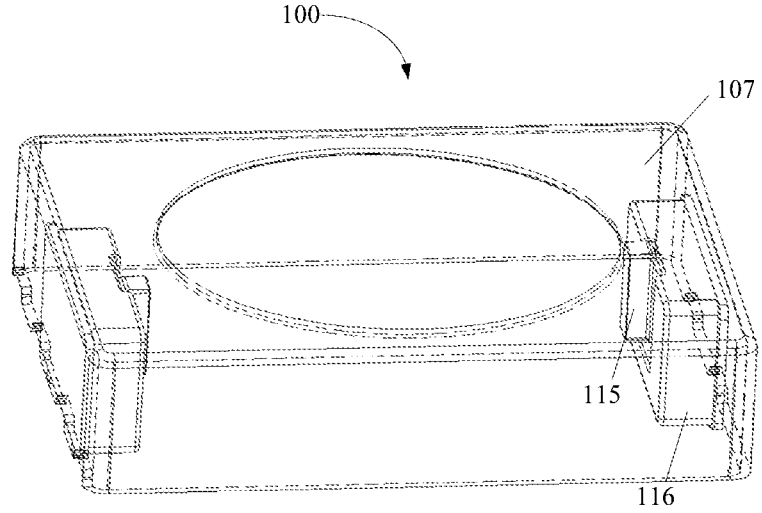
FIG. 3 is a schematic view of the locking structure according the embodiment of the present disclosure.
Figure 4:
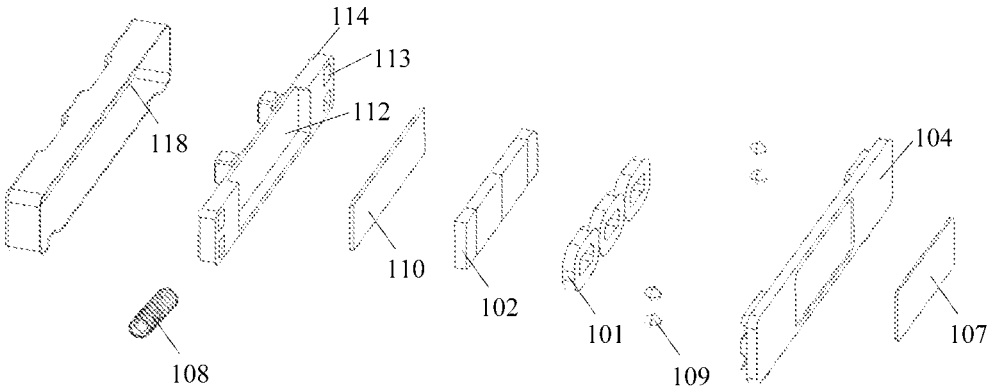
FIG. 4 is schematic structural exploded view of a locking structure according to another embodiment of the present disclosure.
Figure 5:
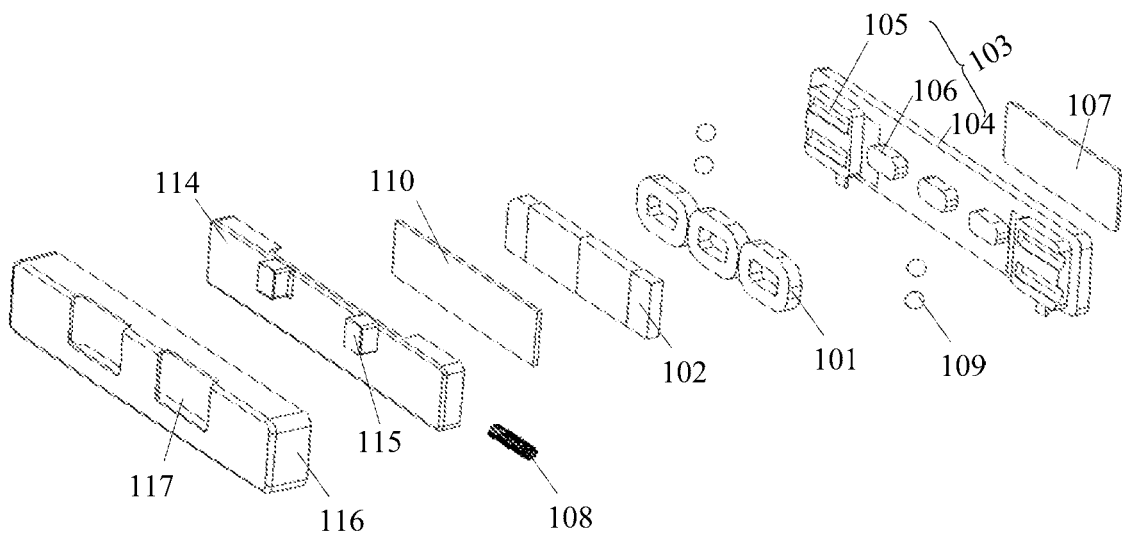
FIG. 5 is a schematic structural exploded view of the locking structure from another perspective according to another embodiment of the present disclosure.
Figure 6:
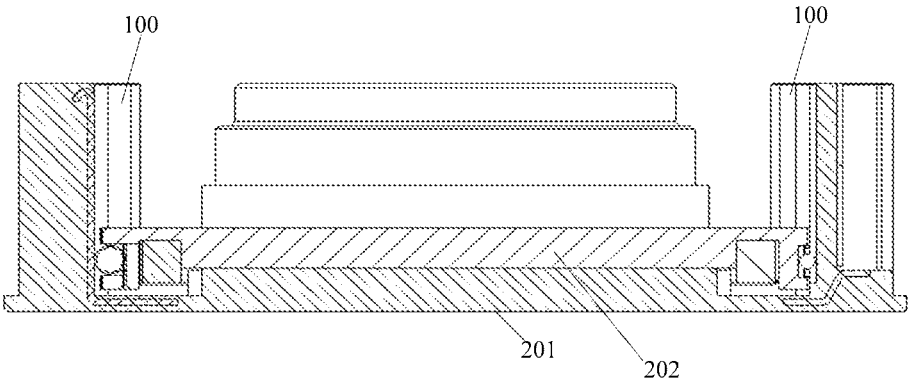
FIG. 6 is a schematic sectional view of a camera module according to an embodiment of the present disclosure in a direction parallel to an optical axis thereof.

FIG. 1 is a schematic structural exploded view of a locking structure according to an embodiment of the present disclosure; FIG. 2 is a schematic structural exploded view of the locking structure in FIG. 1 containing an adsorbing magnetic board; FIG. 3 is a schematic view of the locking structure according the embodiment of the present disclosure; FIG. 4 is schematic structural exploded view of a locking structure according to another embodiment of the present disclosure; FIG. 5 is a schematic structural exploded view of the locking structure from another perspective according to another embodiment of the present disclosure; and FIG. 6 is a schematic sectional view of a camera module according to an embodiment of the present disclosure in a direction parallel to an optical axis thereof.

In order to facilitate observation of an internal structure in FIG. 3, the adsorbing magnetic board is transparent.

Please refer to FIGS. 1 to 2, a locking structure 100 for a camera module includes a coil unit 101 and a magnetic unit 102.

The magnetic unit 102 is provided to be opposite to the coil unit 101. And, when the coil unit 101 is energized, the coil unit 101 may generate a magnetic field with a direction interacting with a magnetic field direction of the magnetic unit 102, to drive a relative movement between the coil unit 101 and the magnetic unit 102.

In this embodiment, the camera module may generally include a base and a movable unit mounted on the base. And, the movable unit may carry a camera to move up and down along a direction of an optical axis. Nevertheless, when the camera module is not working, the movable unit will shake on a horizontal plane perpendicular to the optical axis with impact of an external force, which is prone to damage the camera module. Thus, when the locking structure 100 is mounted on the base, the locking structure 100 is able to fix the movable unit on the horizontal plane perpendicular to the optical axis, to protect the camera module.

In this embodiment, the magnetic unit 102 is provided to be opposite to the coil unit 101. And consequently, when the coil unit 101 is energized, the direction of the magnetic field generated by the coil unit 101 is opposite to the magnetic field direction of the magnetic unit 102, for driving the relative movement between the coil unit 101 and the magnetic unit 102 to realize a function of locking or unlocking. The locking structure 100 is simple in structure and easy to assemble. In addition, when the camera module is not working, the relative movement between the coil unit 101 and the magnetic unit 102 is used to realize the locking effect on the camera module, and when the camera module is working, the relative movement between the coil unit 101 and the magnetic unit 102 enables to unlock the camera module in turn, to ensure that the camera module works fine.

Please continue to refer to FIG. 1, the locking structure 100 further includes a fixing part 103.

The fixing part 103 may include a fixing base 104 and a sliding rail 105 located on the fixing base 104, and the sliding rail 105 extends along a direction parallel to a moving direction of the magnetic unit 102 or the coil unit 101.

In this embodiment, the sliding rail 105 may provide space for the movement of the magnetic unit 102 or the coil unit 101, and the fixing part may include at least two sliding rails 105.

In this embodiment, the fixing base 104 further has a coil winding column 106, and the sliding rail 105 is arranged on two sides of the coil winding column 106, and the coil unit 101 is wound round the coil winding column 106.

In this embodiment, the coil unit 101 is fixed, and the magnetic unit 102 moves relative to the coil unit 101.

According to other embodiments, the magnetic unit 102 may also be fixed, and the coil unit 101 may move relative to the magnetic unit 102.

In this embodiment, the fixed part further includes an adsorbing magnetic board 107, and the adsorbing magnetic board 107 is shell-like and wraps the fixing part and the locking slider therein.

In some embodiments, the camera module has a housing that is equivalent to the adsorbing magnetic board 107.

According to other embodiments, please refer to FIGS. 4 to 5, the adsorbing magnetic board 107 is sheet-shaped, located on the fixing base 103, and located on two opposite sides of the fixing base 103 with the sliding rail 105, respectively, as well as used for adsorbing the magnetic unit 102 on the fixing base 104.

In this embodiment, an adsorption force is generated between the adsorbing magnetic board 107 and the magnetic unit 102, to facilitate connection between the locking slider and the fixing part 103.

In this embodiment, the coil unit 101 is provided with a pin. And, when the pin of the coil unit 101 are energized externally, the coil unit 101 generates a magnetic field with a direction opposite to a magnetic field direction of the magnetic unit 102.

In this embodiment, at least one sliding rail 105 and the remaining sliding rail(s) are arranged on two sides of the coil winding column, respectively. Thus, it is ensured that the locking slider may have a relatively large travel on the fixing base, which is conducive to a better effect of locking or unlocking the camera module.

In this embodiment, the fixing part includes four sliding rails 105, and two of the sliding rails 105 and the remaining two sliding rails 105 are respectively arranged on two sides of the coil winding column 106.

According to other embodiments, the fixing part includes at least two sliding rails 105, and at least one sliding rail 105 and the remaining sliding rail(s) 105 are respectively arranged on two sides of the coil winding column 106.

In this embodiment, the locking structure 100 includes one coil unit 101.

According to other embodiments, please refer to FIGS. 4 to 5, the number of the coil unit 101 is plural.

When the number of the coil unit 101 is plural, the number of the coil winding column 106 corresponds to the number of the coil unit 101, a plurality of the coil units 101 are arranged side by side. And, when the coil units 101 are energized, adjacent coil units 101 generate magnetic fields with opposite directions.

When the number of the coil winding column 106 is plural, the sliding rails 105 are located on two sides of the coil winding columns 106, and the coil winding columns are arranged parallel to each other.

Please refer to FIGS. 1 to 2, the locking structure 100 further includes an elastic part 108.

The elastic part 108 includes one end fixedly connected to the magnetic unit 102.

In this embodiment, when the coil unit 101 is energized, and when the relative movement occurs between the coil unit 101 and the magnetic unit 102, the other end of elastic part 108 may be pressed, and the elastic part 108 is in a compressed state. And, when the coil unit 101 is deenergized, the magnetic field thereof disappears, and the magnetic unit 102 is driven by a resilience force of the elastic part 108 to recover.

In this embodiment, the one end of the elastic part 108 is fixedly connected to the magnetic unit 102, and when the coil unit 101 and the magnetic unit 102 move relative to each other, the other end of the elastic part 108 may be pressed and in a pressed state. Thus, when the coil unit 101 is deenergized, the coil unit 101 does not generate a magnetic field. At this time, because the other end of the elastic part 108 is in a pressed state, the resilience force from the elastic part 108 may likewise drive the relative movement between the coil unit 101 and the magnetic unit 102. As such, the relative movement between the coil unit 101 and the magnetic unit 102 occurred under the action of two different forces may be used to realize an effect of locking or unlocking the camera module, with a simple structure and a relatively wide usable range.

In this embodiment, the elastic part 108 is a spring or an elastic component including a spring. The spring may be a V-shaped or an N-shape spring.

According to other embodiments, a spring-like component may also be adopted as the elastic part 108, as long as it is a part that is able to be compressed and resilient when being released at the same time.

Please continue to refer to FIGS. 1 to 3, the locking structure 100 further includes a locking slider 114.

A sliding piece 109 is provided between the locking slider 114 and the sliding rail 105.

In this embodiment, the sliding piece 109 is a metallic ball, and the metallic ball is in point contact with the sliding rail 105, and the sliding friction force is small, which helps to improve a sliding effect between the locking slider 114 and the sliding rail 105.

According to other embodiments, the sliding piece 109 may also be a roller or a ceramic ball.

In this embodiment, the locking slider 114 has an accommodating cavity 112, and the magnetic unit is detachably connected in the accommodating cavity 112.

In this embodiment, the locking slider 114 has a locking tongue 115, and the locking tongue 115 is located on the outer wall of the accommodating cavity 112.

In this embodiment, the locking slider 114 has one locking tongue 115.

According to other embodiments, please refer to FIGS. 4 to 5, the number of the locking tongue 115 may also be plural. And, when the number of the locking tongue 115 is plural, the locking tongues 115 are evenly arranged in an elongated direction of the magnetic unit 102.

Please continue to refer to FIGS. 1 to 3, the locking slider 114 further has a connecting part 111. The connecting part 111 is located on a side wall of the accommodating cavity 112. One end of the elastic part 108 is detachably connected to the connecting part 111. The connecting part 111 may be a bolt or a screw hole or in another form.

According to other embodiments, please refer to FIGS. 4 to 5, the locking slider 114 may also has no connecting part, as long as one end of the elastic part 108 is bonded together with the side wall of the locking slider 114.

Please continue to refer to FIGS. 1 to 3, the locking structure 100 further includes a casing 116.

One side of the casing 116 is provided with a mounting groove 118, and the locking slider 114 is installed in the mounting groove 118. When the coil unit 101 and the magnetic unit 102 move relative to each other, the other end of the elastic part 108 is against and pressed by a side wall of the mounting groove 118.

Please continue to refer to FIGS. 1 to 3, the mounting groove 118 is provided with a through hole 117, and the locking tongue 115 passes through the through hole 117.

The locking structure further includes a enhance magnetic board 110 adsorbed on a surface of the magnetic unit 102. And, the enhance magnetic board 110 is located between the magnetic unit 102 and the accommodating cavity 112.

In this embodiment, the enhance magnetic board 110 is used for improving the magnetic property of the magnetic unit 102.

In this embodiment, please continue to refer to FIGS. 1 to 3, the number of the magnetic unit 102 is one.

According to other embodiments, please refer to FIGS. 4 to 5, the number of magnetic unit 102 is plural. And, when the number of the magnetic unit 102 is plural, two adjacent magnetic units 102 are provided to have opposite magnetic poles. According to an embodiment, the magnetic units 102 are realized by a piece of magnet with multi-stage magnetization.

Correspondingly, please refer to FIG. 6, the present disclosure further provides a camera module, which includes a base 201; a movable unit 202 for driving a camera to move along a direction of an optical axis thereof; and the locking structure 100, and the relative movement between the coil unit 101 and the magnetic unit 102 is used for locking or unlocking the movable unit 202.

In this embodiment, the locking structure 100 may be used as an independent component, so that when the camera module is used, the locking structure may be tested separately to help to improve a yield of a product. Moreover, because of the existence of the locking structure 100, when the camera module is not working, the locking structure 100 is able to play a role of stabilizing the camera, to prevent damage to the camera due to external force impact, to improve product quality of the camera module. According to some other embodiments, the locking structure may also not include the casing. And, in such embodiments, the locking structure is directly assembled into the housing of the camera module.

In this embodiment, when the number of the locking structures 100 is plural, the locking structures 100 are evenly arranged in the periphery of the movable unit. Specifically, the number of the locking structure is two, and the two locking structures 100 are symmetrically arranged on two opposite sides of the movable unit.

In this embodiment, the relative movement between the coil unit 101 and the magnetic unit 102 is in a direction perpendicular to the direction of the optical axis of the camera, so that the movable unit may be fixed in the direction perpendicular to the optical axis, to reduce damage to the camera due to impact of an external force, and to improve a protective effect on the camera module.

Although the present disclosure is disclosed as above, the present disclosure is not limited hereto. Various changes and modifications may be made by those skilled in the art without departing from the spirit and scope of the present disclosure. Thus, the scope of protection of the present disclosure shall be subject to the scope defined by the claims.

What is claimed is:

1. A locking structure for a camera module, comprising:
   a coil unit;
   a magnetic unit provided to be opposite to the coil unit, wherein in response to the coil unit being energized, the coil unit generates a magnetic field with a direction interacting with a magnetic field direction of the magnetic unit, to drive a relative movement between the coil unit and the magnetic unit; and
   a fixing part including a fixing base and a sliding rail located on the fixing base, wherein the sliding rail extends along a direction parallel to a moving direction of the magnetic unit or the coil unit.

2. The locking structure for a camera module according to claim 1, wherein the fixing base further has a coil winding column, wherein the sliding rail is arranged on two sides of the coil winding column, and wherein the coil unit is wound round the coil winding column.

3. The locking structure for a camera module according to claim 1, wherein the fixing part has at least two sliding rails, and wherein at least one of the sliding rails and the remaining sliding rail(s) are arranged on two sides of the coil winding column, respectively.

4. The locking structure for a camera module according to claim 1, wherein the fixing base has one or more coil winding columns, and wherein the number of the coil winding column corresponds to the number of the coil unit.

5. The locking structure for a camera module according to claim 4, wherein in response to a plurality of the coil winding columns, the sliding rail is located on two sides of the plurality of the coil winding columns, and the plurality of the coil winding columns are arranged parallel to each other.

6. The locking structure for a camera module according to claim 1, wherein the locking structure comprises one or more coil units, wherein in response to a plurality of the coil units, the plurality of the coil units are arranged side by side, and wherein in response to the plurality of the coil units being energized, adjacent coil units generate magnetic fields with opposite directions.

7. The locking structure for a camera module according to claim 1, further comprising an elastic part including one end fixedly connected to the magnetic unit, wherein the elastic part is a spring or is an elastic component including a spring.

8. The locking structure for a camera module according to claim 7, wherein in response to the coil unit being energized, and in response to the relative movement occurring between the coil unit and the magnetic unit, the other end of the elastic part is pressed, and the elastic part is in a compressed state.

9. The locking structure for a camera module according to claim 8, wherein in response to the coil unit being deenergized, the magnetic field thereof disappears, and the magnetic unit is driven by a resilience force of the elastic part to recover.

10. The locking structure for a camera module according to claim 7, further comprising a locking slider, wherein a sliding piece is provided between the locking slider and the sliding rail, and wherein the sliding piece is a metallic ball or a ceramic ball.

11. The locking structure for a camera module according to claim 10, wherein the locking slider has an accommodating cavity, wherein the magnetic unit is detachably fixed in the accommodating cavity, wherein the locking slider has a locking tongue, and wherein the locking tongue is located on an outer wall of the accommodating cavity.

12. The locking structure for a camera module according to claim 11, wherein the locking slider has one or more locking tongues, and wherein in response to a plurality of the locking tongues, the locking tongues are evenly arranged in an elongated direction of the magnetic unit.

13. The locking structure for a camera module according to claim 11, wherein the locking slider further has a connecting part, wherein the connecting part is located on a side wall of the accommodating cavity, and wherein one end of the elastic part is detachably connected to the connecting part.

14. The locking structure for a camera module according to claim 11, further comprising a casing, wherein one side of the casing is provided with a mounting groove, wherein the locking slider is installed in the mounting groove, wherein in response to the magnetic unit and the coil unit moving relative to each other, the other end of the elastic part is against and pressed by a side wall of the mounting groove, and wherein the mounting groove is provided with a through hole, and the locking tongue passes through the through hole.

15. The locking structure for a camera module according to claim 11, further comprising an enhance magnetic board adsorbed on a surface of the magnetic unit, wherein the enhance magnetic board is located between the magnetic unit and the accommodating cavity.

16. The locking structure for a camera module according to claim 1, wherein the fixing part further includes an adsorbing magnetic board, and wherein the adsorbing magnetic board is located on the fixing base, arranged on two opposite sides of the fixing base with the sliding rail, and used for adsorbing the magnetic unit on the fixing base.

17. The locking structure for a camera module according to claim 1, wherein the locking structure comprises one or more magnetic units, and wherein in response to a plurality of the magnetic units, two adjacent magnetic units are provided to have opposite magnetic poles.

18. A camera module, comprising:
a base;
a movable unit for driving a camera to move along a direction of an optical axis thereof; and
at least one locking structure according to claim 1,
wherein the relative movement between the coil unit and the magnetic unit is used for locking or unlocking the movable unit.

19. The camera module according to claim 18, wherein the camera module comprises one or more locking structures, wherein in response to a plurality of the locking structures, the plurality of the locking structures are evenly arranged in the periphery of the movable unit, and wherein the relative movement between the coil unit and the magnetic unit is in a direction perpendicular to the direction of the optical axis of the camera.

* * * * *